Patented Sept. 12, 1922.

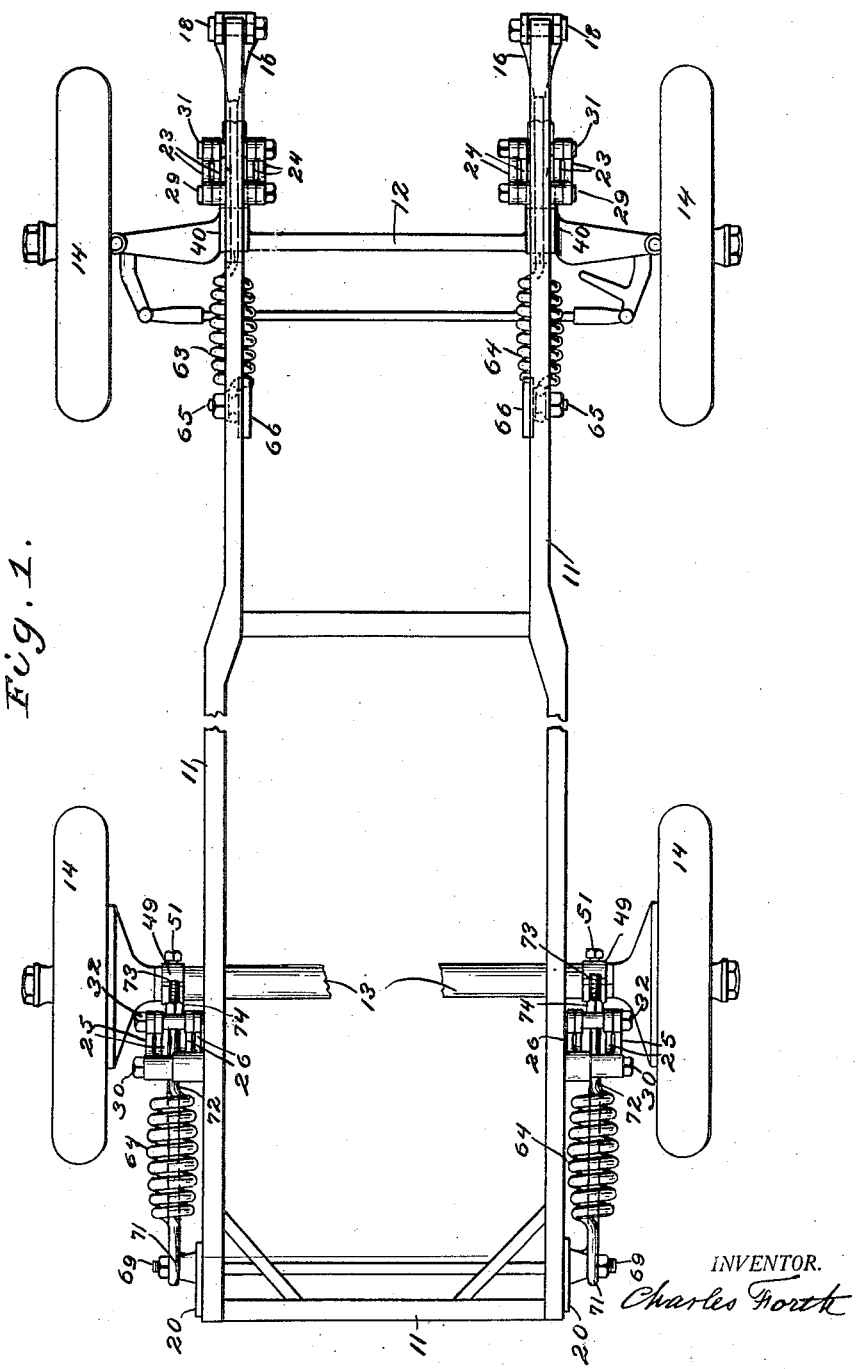

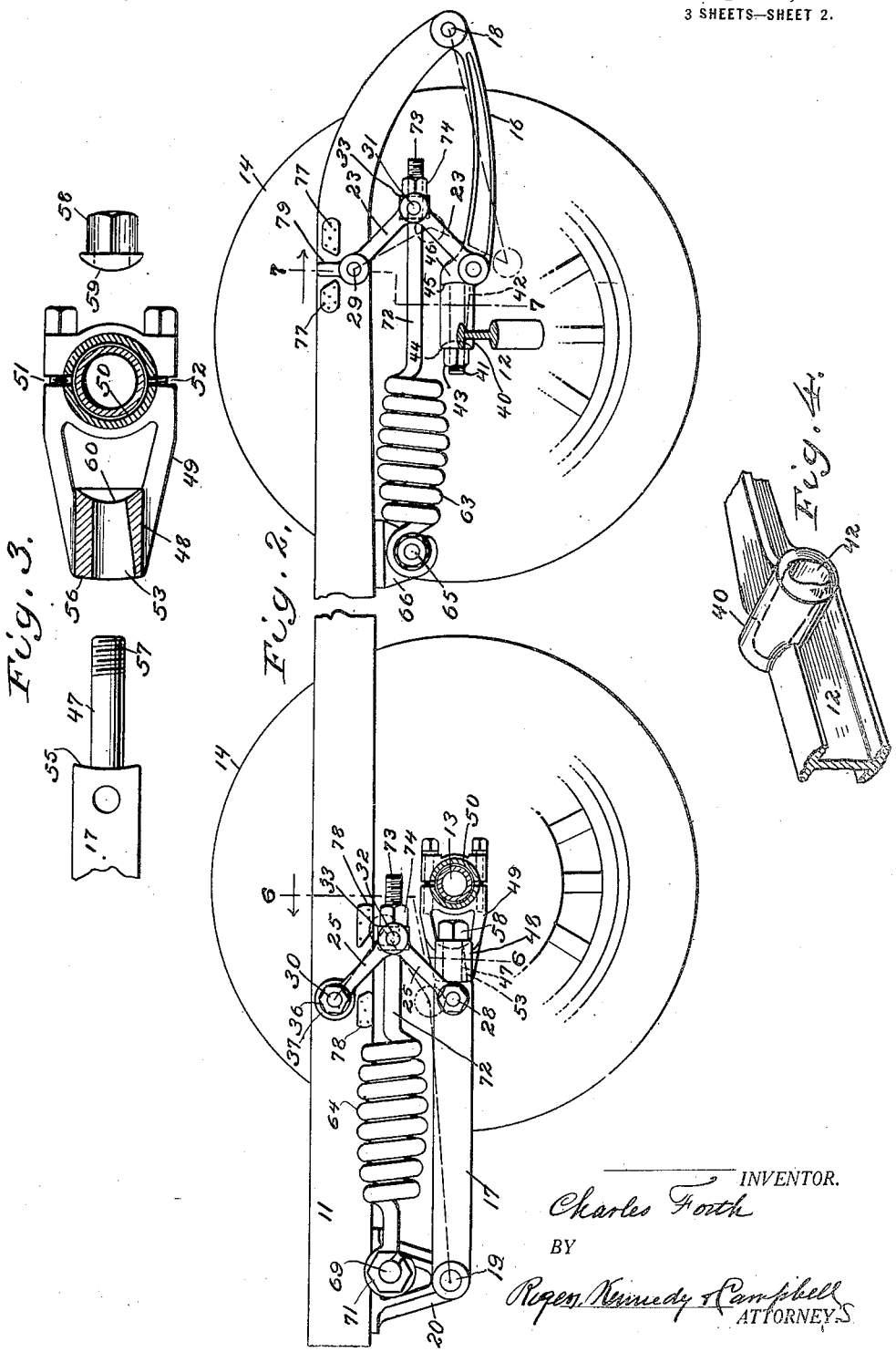

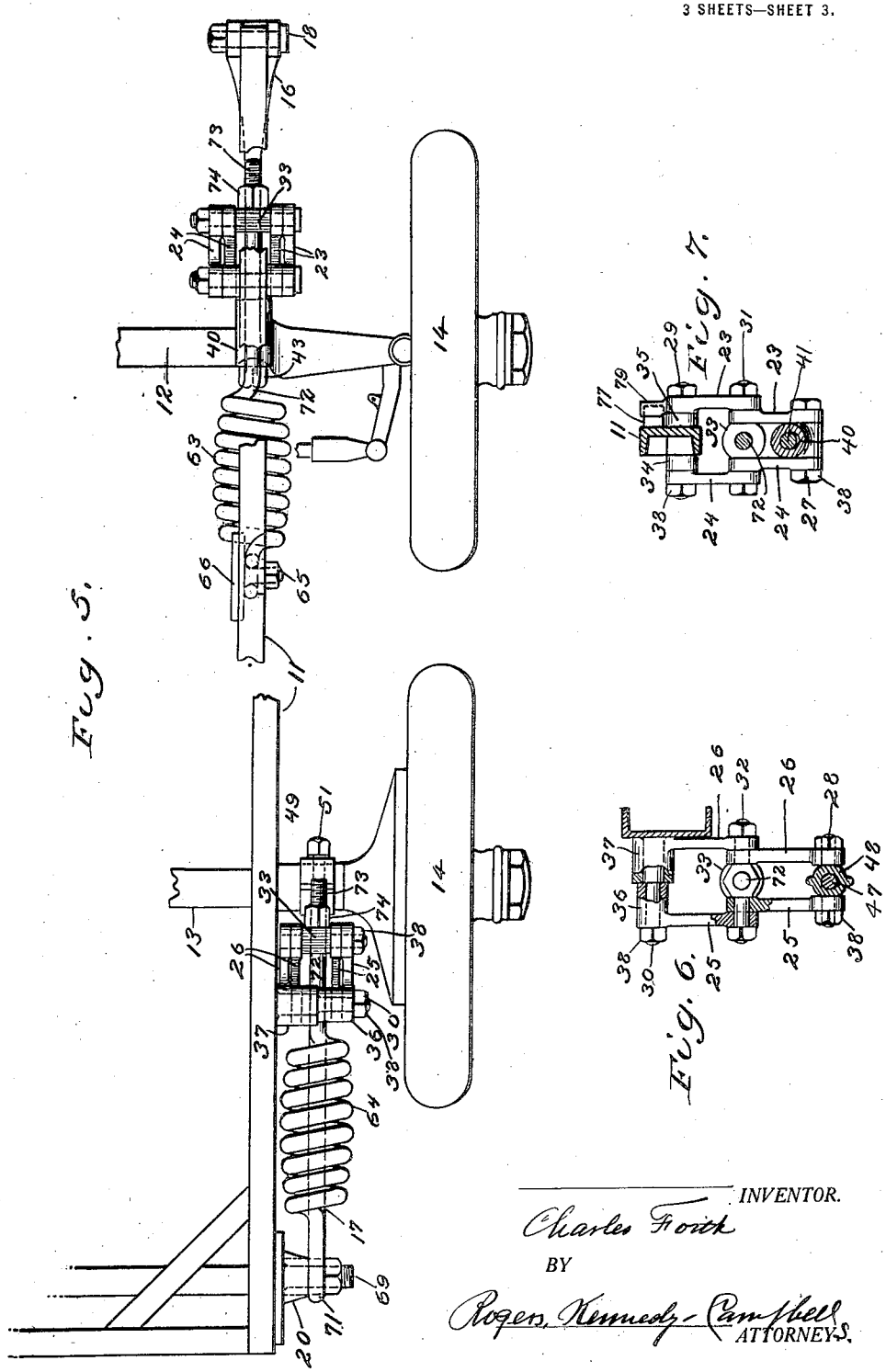

1,428,770

UNITED STATES PATENT OFFICE.

CHARLES FORTH, OF DETROIT, MICHIGAN.

RESILIENT SUPPORT FOR VEHICLE BODIES.

Application filed October 12, 1920. Serial No. 416,398.

*To all whom it may concern:*

Be it known that I, CHARLES FORTH, a citizen of the United States, residing at Detroit, in the county of Wayne and State of Michigan, have invented certain new and useful Improvements in Resilient Supports for Vehicle Bodies, of which the following is a specification, reference being had therein to the accompanying drawing.

The invention relates to means for yieldingly sustaining the body of a vehicle both vertically and horizontally in spaced relation to its axles and wheels, or such other tractive agencies, as runners, bearers and the like, as may be utilized to move the vehicle over the ground or surface underlying the same.

Primarily, the invention has for its object to provide an improved device of the nature set forth, possessing sufficient resilience to support a vehicle so that one may ride in it with all desirable comfort, irrespective of the tire equipment thereof, and though using but one spring at each corner of the vehicle body.

Another object is to produce a device of the class referred to, enabling the user to dispense with the ordinary elliptic springs, or such other springs as are designed for compression or distension in a vertical plane by direct up-and-down movement of the vehicle body, and replacing the same with yielding sub-frames flexibly connected to both the body and the axle or axles of the vehicle, and individually maintained in operative position therebetween by a spring tension exerted in a horizontal direction.

A further object is the production of a device of the type mentioned, admitting of ready application to a motor-car or similar vehicle without altering the structure or interfering with the mechanical organism thereof; also characterized by simplicity, lightness, strength and durability of construction; and capable besides of being originally manufactured and eventually repaired at comparatively small expense, thereby insuring economy both in the cost of initial equipment and subsequent maintenance.

Other objects and advantages of the invention will in part be obvious, and in part be brought out more fully in the following description.

Referring to the accompanying drawings, for a detailed description of this improved device,—

Figure 1 is a top plan view showing a practical embodiment of the invention, some parts being broken away and others omitted;

Fig. 2 is a broken side elevation on an enlarged scale, of the same form of the invention;

Fig. 3 is a detail view of certain parts pertaining to the connection between the resilient support and the rear axle of the vehicle, the parts being disassembled;

Fig. 4 is a perspective view representing part of the connection of the resilient support with the front axle;

Fig. 5 is a top plan view of the construction illustrated in Fig. 2, corresponding therewith in scale and number of parts shown;

Fig. 6 is a transverse section on the irregular line 6—6 of Fig. 2, looking to the left; and Fig. 7 is a similar section on the irregular line 7—7 of Fig. 2, looking to the right.

The invention may be applied to any vehicle for which a resilient support is provided, but it is particularly applicable to motor-cars or automobiles and similar fast-moving conveyances. In practice, it is attached to the chassis or main frame or body of the vehicle, designated by the numeral 11 in Figs. 1, 2 and 5 of the drawings hereto annexed. As there shown, the chassis 11 is mounted, through the medium of the resilient support herein disclosed, upon front and rear axles 12, 13, which are provided at their opposite ends with wheels 14, of usual type. For the sake of brevity and clearness, the invention will be explained herein with reference to these axles and wheels, although they do not in themselves constitute indispensable adjuncts or accessories to the device for the performance of its functions, since they could well be replaced by runners or bearers arranged to slide or otherwise move along the surface traveled over by the vehicle.

A pair of arms, as 16 and 17, is secured to each end of the vehicle body, main frame, or chassis 11, and turned inwardly therefrom toward the front and rear axles 12, 13, respectively. By preference, the forward arms 16 are located directly under the lateral members of the chassis at the opposite sides of the vehicle, as indicated in Fig. 1, and are pivotally connected by means of bolts 18, to downwardly-curved end portions of the said members, as best seen in Fig. 2. The rear arms 17 are similarly connected by bolts 19, projecting laterally outward from brackets 20, fastened to the same members, one to each, at the underside thereof, as shown in the two said figures. The shape of these arms may be varied according to the peculiar structure of any vehicle. Thus, in the exemplification of the invention herein given, the forward pair is slightly curved oppositely to the said end portions of the frame members to which they are attached, whereas the rear pair is straight and substantially parallel to the corresponding portions of the said frame members. However, in both instances, the pivot-bolts and the opposite extremities of the paired arms are intended to be and remain, normally, in horizontal alignment with the axles 12, 13 toward which they are respectively directed. For that reason, the pivots or bolts 18, 19 are placed at or about the same height as the center of the axles 12, 13 from the ground on which the vehicle rests or travels, and the inner ends of the several arms are kept as far as is practicable at the same elevation, which is effected through the instrumentalities next to be described.

Each one of the arms 16, 17 is pivotally attached at or near its inner end to toggle-links, as 23, 24 and 25, 26, likewise coupled with one another and also flexibly connected to the side members of the chassis. Preferably and as shown, these links are used in pairs on the opposite sides of each arm. For example, the inner ends of the forward arms 16 may be placed between the lower ends of the links 23, 24 and pivoted thereto by means of bolts 27, passing through the same, and the rear arms 17 may be similarly located with their inner ends intermediate of the lower ends of the links 25, 26 and joined to the latter by pivot-bolts 28. The front toggle-links 23, 24 are preferably situated so that their upper ends will straddle the side members of the chassis, with which they are pivotally connected by bolts 29, while the rear toggle-links 25, 26 may all be positioned laterally with relation to each of the said members, exteriorly thereof, and held to them by pivot-bolts 30.

As detailed in Figs. 6 and 7, the links in the different pairs are coupled together by eye-studs or pivot-pins 31, 32, respectively which also serve to connect adjacent pairs of the links to each other, as 23 to 24 and 25 to 26, respectively. An enlarged middle portion 33, of each stud or pivot-pin, acts as a spacer between the adjacent pairs of links, where they unite in forming a double toggle or knuckle joint. The lower ends of the adjacent pairs are spaced to an equal extent by the inner ends of the arms 16 and 17, to which they are pivoted. At their upper ends, the contiguous pairs may be kept apart and also in parallelism by fittings of various descriptions. Thus, as shown in Fig. 7, the paired links 23 and 24 are spaced from the opposite sides of one member of the chassis 11, by means of washers 34 and 35, while as represented in Fig. 6, the paired links 25 and 26 are held apart on the outside of the chassis by bosses or socket-pieces 36 and 37, projecting inwardly from their upper ends and arranged to abut one against the other. The extremities of the several pivots are threaded and engaged by nuts 38, serving to maintain the links securely in their respective positions.

All of the arms 16, 17 are directed inwardly from the opposite ends of the vehicle toward the front and rear axles 12, 13 respectively, with which they are flexibly connected. For the latter purpose, bearings 40 are provided on the front axle 12, one for each arm 16. These bearings are intended to be stationary, and therefore they may be cast integral with the axle. The inner end of each arm 16 is preferably rounded, as at 41, and loosely fitted in a tapering or outwardly flaring hole or bore 42, in its bearing 40, as indicated by dotted lines in Fig. 2, on the right-hand side. A nut 43, threaded on the extremity of the rounded portion of the arm, retains it in place by pressing against the inner end of the bearing 40, and this nut has a semi-spherical or ball-shaped base 44, seated in a corresponding concavity in the adjoining end of the bearing, so that the said rounded portion may have a universal rocking movement therein. The outer end of the bearing also is curved, as at 45, and engages a concave seat 46, in the arm. The rear arms 17 are likewise formed each with a round portion or supporting element, designated by the numeral 47 in Figs. 2, 3 and 6, which latter-named portion is adapted to be passed through a hub 48, provided therefor at the outer end of a yoke 49, that encircles a stationary housing 50, surrounding the rear axle 13. The hub of the yoke, two of which are furnished for the rear arms 17 on the opposite sides of the vehicle, constitutes the bearing for the round portion 47 of the arm in each instance. The yoke, in the form shown, includes oppositely faced segmental parts that are rigidly held one to the other by screws or bolts, as 51 52. A tapering or outwardly flaring hole or bore 53 is also provided in each hub 48, to receive the rounded portion 47, so that each of the rear arms 17 may have a universal rocking movement in its bearing, like either of the forward arms 16, as above mentioned. In order to facilitate this movement, the arms 17 are formed with concave seats, as 55, arranged to receive correspondingly curved terminals 56 of the hubs through which their respective rounded portions 47 are passed. In each case, the round portion 47 projects beyond the hub into the yoke 49, and its inner end is externally threaded as at 57, and is engaged by a nut 58, which retains it within the hub and yoke. The base of the nut 57 is semi-spherical or ball-shaped, as indicated at 59, and fits in a similarly curved seat 60, formed in the inner end of the hub 48.

The arms pivotally attached to the ends of the side members of the chassis combine with the toggle-links, similarly connected both to the said members and to the said arms, in forming what may be termed flexibly-jointed sub-frames under the vehicle body. These sub-frames are intended to support the body of the vehicle resiliently from its axles, and with that end in view, they are tensioned, preferably by means of coil-springs, as 63, 64 respectively. In the present embodiment of the invention, the sub-frames at the forward end of the vehicle are equipped each with a spring 63, connecting the double knuckle-joint of the paired links 23, 24 with a rigid anchorage, substantially opposite the rear peripheral edge of the front wheels, which anchorage may consist of a bolt or pin 65, projecting laterally outward from a bracket 66, secured to the chassis 11, at the underside. The sub-frames at the rear end are furnished in a like manner each with a spring 64, extending from the juncture of the paired links 25, 26 to an anchor located beyond the rear wheels, which also may be in the nature of a bolt or pin 69, projecting outwardly from the side of the rear bracket 20, previously mentioned. As shown, both the front and the rear anchors are rearwardly disposed in relation to the axles 12, 13 respectively, and the springs 63, 64 all run forwardly from these anchors to their respective toggle-links in an approximately horizontal direction.

The mode of attachment is practically identical for the front and rear springs. Thus, the several springs are provided at the rear ends each with an eye or hook 71, capable of engaging the anchors, 65 or 69, and with a forwardly-extending stem 72, adapted to pass through the eye-studs or pivot-pins 33 respectively. As seen in Figs. 6 and 7, the latter-named element has a transverse aperture, which forms the eye of the stud and provides a bearing for the stem 72 of any one of the springs. The forward end of the stem 72 is externally threaded, as at 73, for the reception of a nut 74, which is brought to bear against the apex of the paired links at their angle presented by the paired links at their junction. It will be perceived that as the nut is run in and tightened upon the common pivot of the links, they will spread apart vertically, while the spring stretches horizontally in a corresponding ratio, thereby tensioning the sub-frame to which the spring appertains.

Four sub-frames of the character described are preferably employed, one at or near each corner of the chassis, the same being functioned to raise the vehicle body and keep it normally at a uniform elevation throughout from the axles thereunder. In the form of the invention herein illustrated, the springs used for tensioning the several sub-frames are set and intended to be kept approximately parallel to the lateral members of the chassis, both beside and beneath the body of the vehicle, and directly above the pivoted arms, with which also they are substantially in parallelism. However, the anchor-bolts and eye-studs for the opposite ends of the springs, and the pivots for the inner and outer ends of the arms, are respectively aligned in normal conditions, regardless of the shapes given to the springs, the arms, or the members of the chassis.

It is understood that the elasticity of the springs coacts with the flexibility of the sub-frames and their connections in imparting to the chassis or body of the vehicle a high degree of resilience, which is sufficient to enable it to absorb shocks and yieldingly support the load, while moving in either a vertical or a horizontal direction relatively to the axles, whenever an obstacle is encountered by any one of the wheels. The movement, however, is proportionate to the force of tension placed upon the sub-frames, and the variable angularity of the toggle-links at their common pivots, the maximum range of which is indicated, in a general way, by dotted lines in Fig. 2. According to the arrangement exemplified, the angle of the several pairs of links is pointed permanently forwards in all instances, and the reversal thereof is prevented by stop-plates 77 and 78, used in pairs and secured to the upper and lower edges, respectively, of the side members of the chassis. As represented, one of the upper links in the forward pairs is provided with an integrally formed extension or prolongation 79, projecting upwardly between the stops 77; and one of the upper links in the rearwardly-disposed pairs is positioned intermediate of the stops 78. The stop-plates, it will be noted, are affixed to both sides of the chassis, forward and rearward, and severally constitute safety abutments for the paired links pertaining to any of the sub-frames to recline on, in case of breakage or displacement of the tensioning springs.

The operation of the device is as follows:—

Assuming that it has been properly set up, with the sub-frames under tension and disposed between the chassis and the axles substantially in the manner represented in Fig. 2, and that the motive power is applied so as to drive the vehicle in a forward direction, for instance by means of an engine mounted thereon, actuating the rear axle and traction wheels, then the yokes 49, on the axle housing 50, will pull on the inner ends 47 of the pivoted arms 17, through the hubs or bearings 48, and nuts 58, and cause the rear sub-frames to draw the chassis forward. At the same time, the sub-frames in front, being also carried forward by the chassis, will exert a similar action on the front axle, through their pivoted arms 16, owing to the flexible connections between it and the latter-named arms, thereby causing the forward wheels to advance. The engine power is thus transmitted to the four wheels. If the engine were reversed, the several parts here referred to would, of course, operate in the opposite direction. The bearings 40 and 48 are held rigidly in a substantially horizontal position, by the front axle and the housing of the rear axle respectively, and the round portions 41 and 47 of the arms loosely journaled in these bearings are kept for the full length thereof in contact with the upper faces of the tapering bores 42 and 53, when the vehicle stands in normal position, whether loaded or not, and also while it moves on a theoretically level line, the said upper faces being then horizontally disposed, and the lower faces inclined downwards. If the wheels happen to roll on different inclines, they go up or down in conformity with the nature of the surface affecting each wheel individually, the pivoted arms of the sub-frames acting directly on or from the four corners of the vehicle without straining the coil-springs. When a wheel strikes an obstacle and rides on and off the same, at any speed, its axle is correspondingly raised and lowered, together with the adjacent bearing thereon, and the pivoted arm having its inner end journaled in this bearing is simultaneously oscillated in a vertical plane. The inner rounded end of the arm has a free rocking or oscillatory motion in the tapering bore provided for it, due to the universally tiltable joints constituted at both terminals thereof by the outcurved end of the bearing that enters the concave seat in the arm, and the hemispherical base of the nut likewise seated in the incurved end of the bearing. The connections between the axles and the sub-frames forming the resilient support, therefore, are such as will afford it what may be called a universal motion while the vehicle is traveling, that is, a free tilting or rocking movement in any direction from one center. With a solid axle, the wheels at the ends thereof may move in opposite directions at the same time, the tapering bores of the bearings for the rounded inner ends of the arms having sufficient amplitude to meet the double requirements. As the arms swing up or down to a greater or less extent, synchronously with the ascent or descent of the wheels rolling over the ground's surface, the toggle links coincidentally spread apart or approach one another in the same ratio, though the extreme pivotal connections of these links are maintained practically in alignment at all times. The central pivots of the links naturally are moved in every direction, but no undue strain is imposed upon the links on account of this movement, owing to the play allowed to the stems of the coil-springs about their points of anchorage and through the pivots themselves.

The resilient support herein shown and described is well adapted to fill the purpose for which it has been devised, inasmuch as it provides a simple, strong, and efficient appliance capable of readily absorbing heavy shocks and checking abnormal rebounds, and taking care as well of minor concussions or vibrations. The sub-frames constitute a group of resilient units, each substantially complete in itself, and easily attached to the body of the vehicle and one of its axles. In fact, the several units may be constructed independently for each corner of the vehicle, and applied thereto speedily with the aid of ordinary tools. They dispense altogether with elliptic springs of any of the forms hitherto employed, and may well be used also for vehicles the wheels of which are equipped with solid rubber tires, instead of the pneumatic variety. This is made possible because, by virtue of their inherent resiliency and the suppleness of their pivotal and rocking connections, the jointly acting sub-frames operate to hold the body of the vehicle in a floating position, so to say, over the axles and maintain it in equilibrium thereon, while the wheels surmount and suffice alone to break the force of impact of the obstacles or obstructions that are encountered.

In its broader aspect, the invention is not restricted to the precise construction and arrangement of parts shown and described, nor to any specific manner of carrying it into practice, as many changes may be made in the details without departing from the main principles of the invention and without sacrificing its chief advantages.

Having now described my invention, what I claim, and desire to secure by Letters Patent of the United States, is:—

1. In combination with a vehicle body, a supporting axle therefor, a fore and aft extending arm pivotally connected respectively with the body and axle, a flexible connecting member pivoted respectively to said arm and said body, and a spring anchored to the body and connected with said flexible connecting member.

2. In combination with a vehicle body, a supporting axle therefor, a fore and aft extending arm pivotally connected at its outer end with the body and having a universal connection at its inner end with the axle, a flexible connecting member pivoted respectively to the body and arm, and a spring anchored to the body and connected with said flexible member.

3. In combination with a vehicle body, a supporting axle therefor, a fore and aft extending arm pivotally connected at its outer end with the body and connected at its inner end with the axle to permit the latter to rock relatively thereto about a horizontal fore and aft axis, a flexible connecting member pivoted to the arm and to the body, and a spring anchored to the body and connected with said flexible member.

4. A resilient support for the body of a vehicle, having supporting axles and wheels, said resilient support including a flexibly jointed sub-frame comprising an arm pivoted to the vehicle body, a flexible connecting member jointed respectively to the arm and body, and means acting on said flexible member to tension the sub-frame, the said arm being connected with the axle by a universally rocking connection.

5. In combination with a vehicle body and its front and rear supporting axles, fore and aft extending arms at the forward end of the body on its opposite sides pivoted at their forward ends to said body and pivoted at their rear ends to the front axle, flexible connecting members jointed respectively to the arms and vehicle body, springs anchored to the vehicle body in rear of the front axle and connected respectively with said flexible members, fore and aft extending arms at the rear end of the body on the opposite sides of the same pivoted at their rear ends to the vehicle body and at their forward ends to the rear axle, flexible connecting members pivoted respectively to said arms and to the vehicle body, and springs anchored to the vehicle body in rear of the rear axle and connected with the said flexible members respectively.

6. A resilient support for a vehicle body provided with an axle, said support including an oscillatable arm flexibly connected respectively with the vehicle body and the axle, two links pivoted together at their inner ends and pivoted at their outer ends respectively to said arm and vehicle body, and means acting on said links to tension the same.

7. A resilient support for a vehicle body with an axle thereunder, including an oscillatable arm normally directed toward the axle substantially in parallelism with the vehicle body and holding them flexibly together, links connecting said body to said arm, and a tension spring having one end fixed relatively to the body and its other end arranged to move with the joint of said links.

8. A resilient support for a vehicle body provided with an axle, including an oscillatable arm flexibly holding the body and axle together, toggle-links pivotally connecting said arm with said body, a spring having a stem portion slidable at one end through the joint of said links, means serving to retain said stem portion in said joint, and an anchor on the vehicle body for the opposite end of said spring.

9. A resilient support for a vehicle body provided with an axle, including an arm flexibly connecting said body and said axle so as to hold them together, jointed links also having flexible connections with both said arm and the vehicle body, said links being disposed at a variable angle one relatively to another, a coil-spring passing loosely at one end through the joint of the links, an anchor for the other end of said spring, and tensioning means arranged to draw on the spring and coincidentally move said angle toward said anchor.

10. A resilient support for a vehicle body provided with an axle, including an arm pivotally attached to said body at one end and having a flexible connection with said axle at the other end, toggle-links also pivoted both to the vehicle body and to said arm, and a spring located intermediate the latter and the body, said spring having one end anchored adjacent to the pivot of the arm and its other end operatively connected with the joint of said toggle-links.

11. A resilient support for a vehicle body comprising in combination with an axle under the vehicle, a flexibly jointed and tensioned sub-frame pivotally attached to one end of said body at a distance from said axle, and oppositely extended rigid elements projecting respectively from the axle and said sub-frame, one of said elements being in the form of a fore and aft bearing which loosely receives the other element, and the said bearing and element being relatively formed to permit of a universal relative rocking motion of the parts.

12. A resilient support for a vehicle body positioned so as to be sustained from an axle, including a flexibly jointed sub-frame pivotally connected with said body, means for tensioning said sub-frame, a bearing on said axle provided with a tapered opening, and a supporting element of less diameter projecting into said opening from an adjacent part of the sub-frame, the said supporting element having a free rocking motion in said tapered opening.

13. A resilient support for the body of a vehicle provided with axles arranged substantially in parallelism thereunder, comprising flexibly jointed and tensioned sub-frames pivotally secured to the opposite ends of said body respectively so as to sustain the weight thereof at points remote from said axles, relatively stationary bearings on the latter extending in an approximately horizontal plane toward said sub-frames and having flaring bores, and supporting elements on the sub-frames engaging in said bores.

In testimony whereof, I have affixed my signature hereto.

CHARLES FORTH.